US009792152B2

(12) United States Patent
Warszawski et al.

(10) Patent No.: US 9,792,152 B2
(45) Date of Patent: Oct. 17, 2017

(54) HYPERVISOR MANAGED SCHEDULING OF VIRTUAL MACHINES (71) Applicant: Red Hat Israel, Ltd., Raanana (IL)

(72) Inventors: Eduardo Warszawski, Kfar Saba (IL); Yeela Kaplan, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 64 days.

(21) Appl. No.: 14/137,746

(22) Filed: Dec. 20, 2013

(65) Prior Publication Data

US 2015/0178111 A1   Jun. 25, 2015

(51) Int. Cl.
*G06F 9/455* (2006.01)
*G06F 9/50* (2006.01)

(52) U.S. Cl.
CPC ............ *G06F 9/50* (2013.01); *G06F 9/45558* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 7,814,495 B1 * | 10/2010 | Lim | G06F 9/45558 717/168 |
| 8,301,840 B2 | 10/2012 | Anand et al. | |
| 2005/0091365 A1 * | 4/2005 | Lowell | G06F 9/45533 709/224 |
| 2012/0054409 A1 | 3/2012 | Block et al. | |
| 2012/0233623 A1 | 9/2012 | van Riel | |
| 2013/0047159 A1 | 2/2013 | Low et al. | |
| 2013/0155045 A1 | 6/2013 | Khodorkovsky et al. | |
| 2014/0032761 A1 * | 1/2014 | Beveridge | 709/226 |
| 2015/0058861 A1 * | 2/2015 | Zheng et al. | 718/104 |

OTHER PUBLICATIONS

Zhi Li, et al., "Affinity-Aware Dynamic Pinning Scheduling for Virtual Machines," Beijing Key Laboratory of Network Technology, BeiHang University, Nov. 30, 2010-Dec. 3, 2010, 8 pages, Beijing, China.
Vinod Mohan, "VSPHERE™ 5.1 VS. HYPER-V® 2012—Part 3—'CPU Scheduling'," Geek Speak, Jul. 26, 2013, 2 pages.
Denghui Liu, et al., "FEAS: A full-time event aware scheduler for improving responsiveness of virtual machines," Proceedings of the Thirty-Fifth Australasian Computer Science Conference, 2012, 8 pages, Melbourne, Australia.
Yoav Etsion, et al., "A Global Scheduling Framework for Virtualization Environments," School of Computer Science and Engineering, The Hebrew University of Jerusalem, Jerusalem, Israel, Barcelona Supercomputing Center (BSC), Barcelona, Spain, 2009, 8 pages.

* cited by examiner

*Primary Examiner* — Tammy Lee
(74) *Attorney, Agent, or Firm* — Lowenstein Sandler LLP (57) ABSTRACT

A hypervisor determines that a virtual machine is important. In response, the hypervisor selects one or more processing devices of a multiprocessor computer system and pins the virtual machine to the selected processing devices. The virtual machine exclusively executes in the selected processing devices resulting in an unfair resource allocation.

20 Claims, 6 Drawing Sheets

HYPERVISOR MANAGED SCHEDULING OF VIRTUAL MACHINES

TECHNICAL FIELD

Embodiments of the present invention relate to allocating processing resources to virtual machines, and in particular, relates to unfairly allocating processing resources to virtual machines.

BACKGROUND

In a multi-processor system, processing resources are typically allocated fairly among different processes. For example, a completely fair scheduler (CFS) is a process scheduler of an operating system (OS) that handles processing resource allocation for executing processes. A completely fair scheduler aims to allocate processing resources fairly among processes while maximizing overall processing device utilization as well as interactive performance.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for managing virtual machines with a hypervisor. Some aspects of the present disclosure are directed to a hypervisor using unfair resource allocation to allocate processing resources to virtual machines.

As noted above, in a multiprocessor system, processing resources, such as CPUs (central processing units), processing device time slots, or processing device power, are typically allocated fairly among different processes. For example, a completely fair scheduler (CFS) is a process scheduler of an operating system (OS) that handles processing resource allocation for executing processes. A CFS aims to allocate processing resources fairly among processes while maximizing overall processing device utilization as well as interactive performance.

However, there may be a situation where it would be desirable for a particular process or a virtual machine performing a particular task to have a higher priority in resource allocation than other processes. In particular, it may be desirable to be able to run the process or the virtual machine without interruption. Such a process or task may be designated "important" by a user or automatically based on predetermined criteria. Examples of important processes include, but are not limited to, a computationally intensive process, an audiovisual rendering process, or a computer gaming process.

Thus, described herein is an unfair resource allocation that facilitates intelligent utilization of the processing resources of a multiprocessor computer system. In some aspects, an important process is pinned to a specific processing device of a multiprocessor computer system having multiple processing devices. The important process is allocated substantially all of the time slots and processing power of the specific processing device it is pinned to.

Because a virtual machine is a user-space process that runs on a hypervisor, a virtual machine may be designated an important process and pinned to a specific processing device. On a hypervisor running multiple virtual machines, the processor can receive interrupts for a number of sources, such as the network card of a virtual machine the hardware of the hypervisor, or another process running in the hypervisor, that can interrupt execution of other virtual machines. A 'completely unfair scheduler' can be used to pin an important virtual machine to a specific processor device so that the important virtual machine can avoid such interruptions.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some embodiments are described herein with reference to a hypervisor managing virtual machines. However, it should be appreciated that the principles introduced and described with reference to hypervisors also apply to other forms of process management. Accordingly, embodiments of the present invention are not limited to hypervisors, and those embodiments describing hypervisors may be modified for other purposes.

Figure 1:
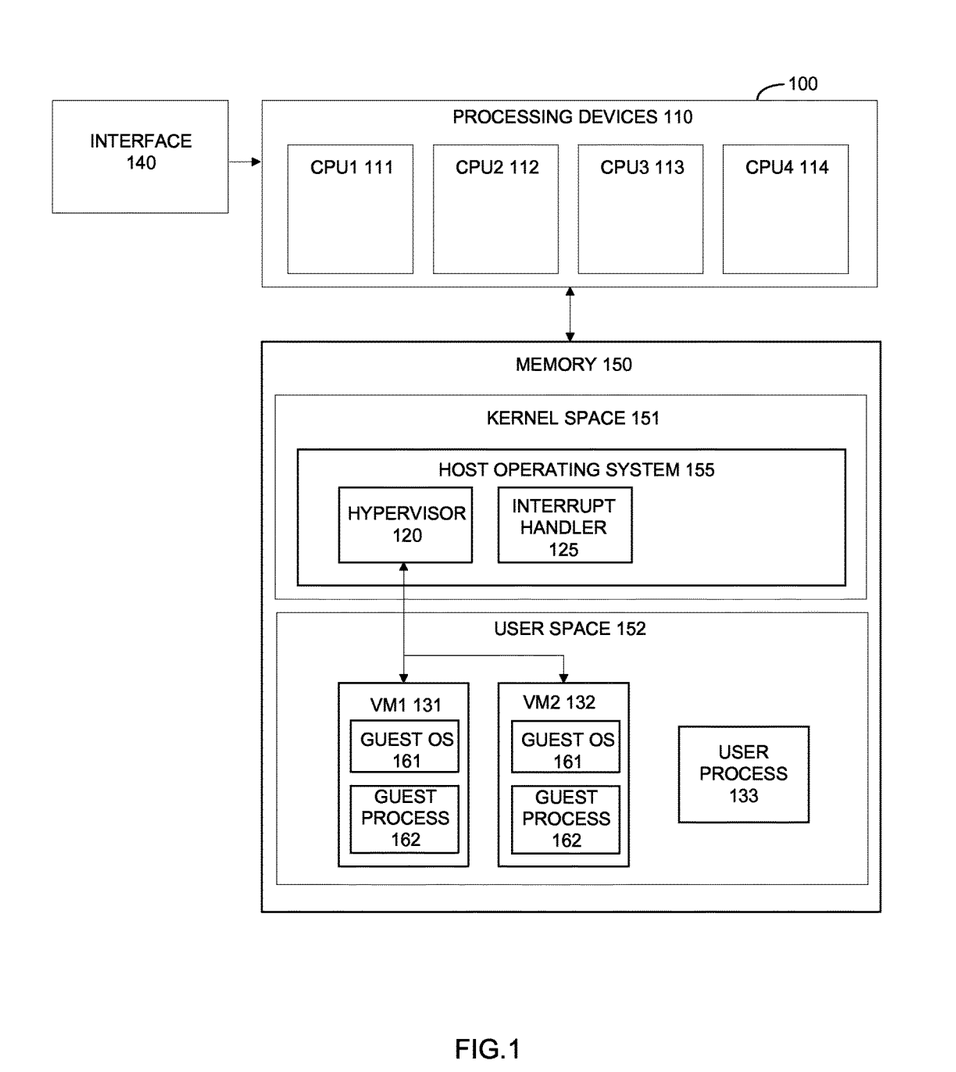
FIG. 1 is a block diagram that illustrates an embodiment of a multiprocessor computer system with a hypervisor.

FIG. 1 is a block diagram that illustrates an embodiment of a multiprocessor computer system 100 that includes a hypervisor 120. The multiprocessor computer system 100 may be a rackmount server, a workstation, a desktop computer, a notebook computer, a tablet computer, a mobile phone, a palm-sized computing device, a personal digital assistant (PDA), etc.

The multiprocessor computer system 100 includes a plurality of processing devices 110, including a first processing device (CPU1) 111, a second processing device (CPU2) 112, a third processing device (CPU3) 113, and a fourth processing device (CPU4) 114. In other aspects, the multiprocessor computer system 100 may have more or fewer processing devices 110.

The processing devices 110 are coupled to an interface 140 and a memory 150. The interface 140 may be used to receive requests to instantiate a virtual machine or to provide a virtual machine to a user. The interface 140 may comprise a wireless or wired connection to a network or may comprise physical interface devices, such as a keyboard or monitor.

The processing devices 110 define a kernel space 151 and a user space 152 in the memory 150. The kernel space 151 and user space 152 may be part of system memory created by a host operating system 155 executed by the processing devices 110. The host operating system 155 may run a number of operating system processes in the kernel space 151 as well as managing one or user processes 133 in the user space.

The host operating system 155 may include a hypervisor 120 that runs in the kernel space and creates and manages one or more virtual machines 131, 132 in the user space 152 as user-space processes. Each of the virtual machines includes a guest operating system 161 which manages one or more guest processes 162.

The host operating system 155 may also include an interrupt handler 125 running in kernel space 151. An interrupt is a signal emitted by hardware or software indicating an event that needs immediate attention. In response to receiving an interrupt, executing processes (or threads) are halted and an interrupt handler is immediately run before resuming execution of the processes. However, as described below, in a multiprocessor computer system executing a hypervisor utilizing unfair resource allocation, an interrupt may not halt execution of processes on all processing devices, but rather only one or a subset of the processing devices, and a virtual machine may be executed on a particular processing device that is not interrupted.

Figure 2:
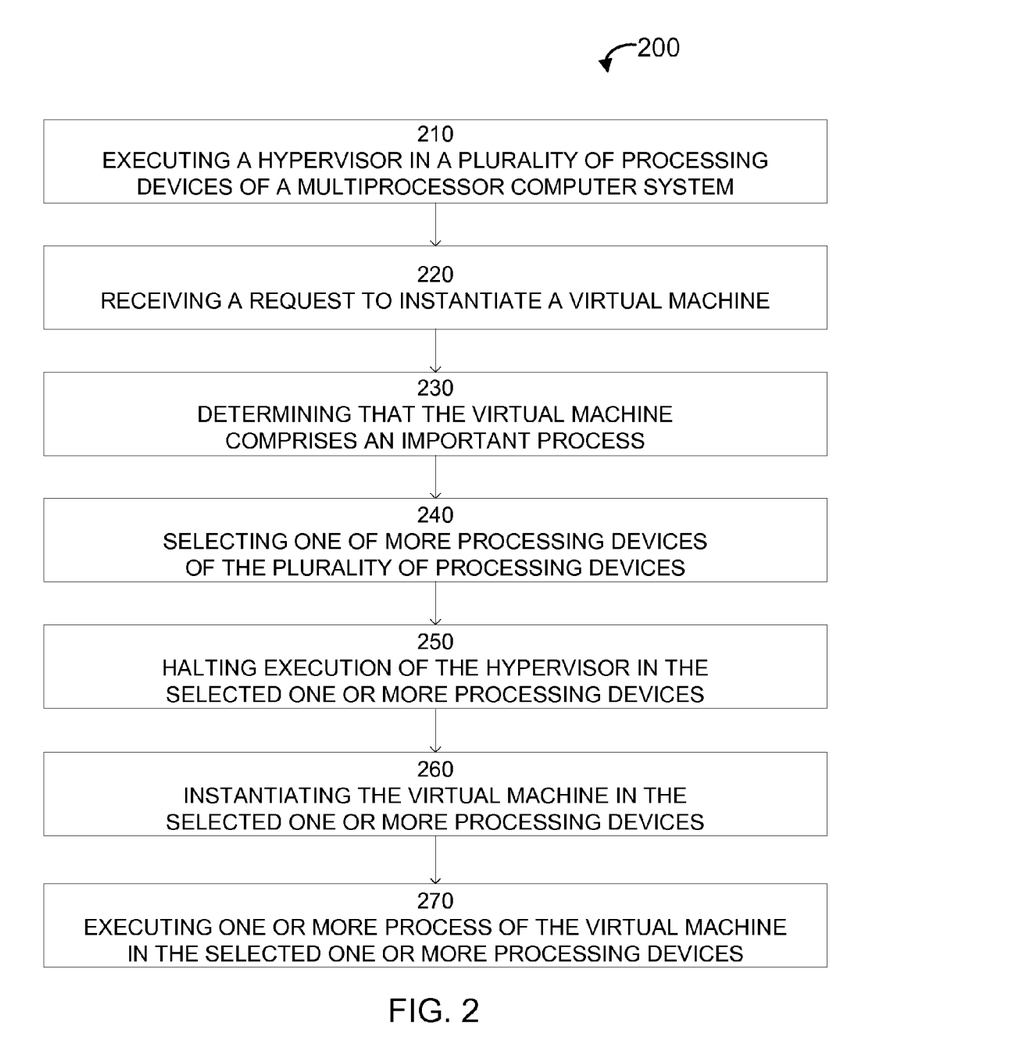
FIG. 2 is a flow diagram that illustrates an embodiment of a method of instantiating a virtual machine in a dedicated processing device.
Figure 3A:
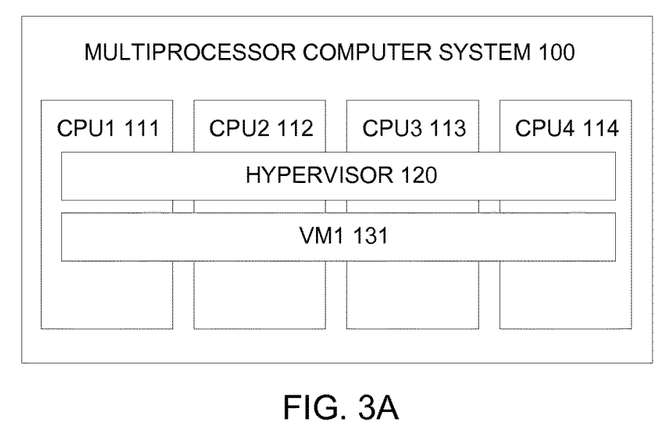
FIG. 3A is a block diagram that illustrates an embodiment of a multiprocessor computer system running processes in all processing devices of the multiprocessor computer system.
Figure 3B:
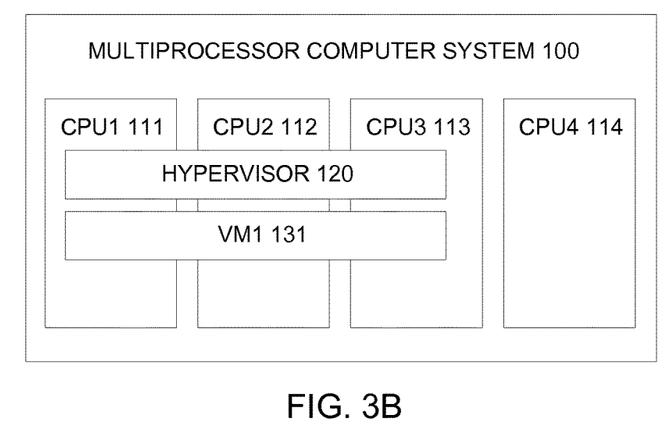
FIG. 3B is a block diagram that illustrates the multiprocessor computer system of FIG. 3A with a dedicated processing device for an uninstantiated virtual machine.
Figure 3C:
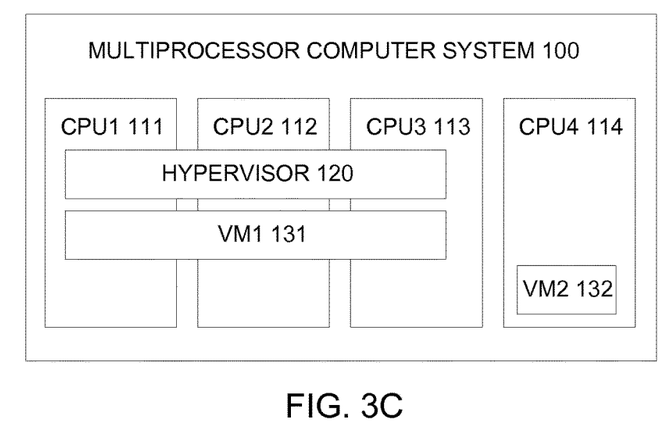
FIG. 3C is a block diagram that illustrates the multiprocessor computer system of FIG. 3B with a virtual machine instantiated in the dedicated processing device.

FIG. 2 is a flow diagram illustrating one embodiment for a method 200 of instantiating a virtual machine. The method 200 of FIG. 2 is described below with further reference to FIGS. 3A-3C which diagrammatically show processing resource allocation. Whereas FIG. 1 illustrates the allocation of memory 150 into a kernel space 151 and a user space 152 and indicates which space a hypervisor 120 and various virtual machines 131, 132 are executed, FIGS. 3A-3C illustrate the allocation of processing devices 110 to the hypervisor 120 and virtual machines 131, 132 at various stages of the method 200 of FIG. 2.

Method 200 may be performed by processing logic that may include hardware (e.g., circuitry, dedicated logic, programmable logic, microcode, etc.), software (e.g., instructions executed by a processing device), or a combination thereof. For example, method 200 may be performed by host operating system 155 of FIG. 1.

At block 210 of method 200, a hypervisor is executed in a multiprocessor computer system having a plurality of processing devices. FIG. 3A illustrates an exemplary processing resource allocation that may result after block 210. As shown in FIG. 3A, a hypervisor 120 is executed in all four processing devices 111-114 of the multiprocessor computer system 100. Similarly, a first virtual machine 131 is also executed in all four processing devices 111-114 of the multiprocessor computer system 100.

At block 220, a request to instantiate a virtual machine is received. The request may be received by the hypervisor 120 or the host operating system 155. The request may be received over the interface 140.

At block 230, it is determined that the virtual machine comprises an important process. This determination may be made by the hypervisor 120. In one aspect, the hypervisor 120 determines that the virtual machine comprises an important process automatically based on predetermined criteria. In another aspect, the hypervisor 120 determines that the virtual machine comprises an important process based on an input received from a user. For example, the request to instantiate the virtual machine may indicate that the virtual machine comprises an important process. As another example, the request to instantiate the virtual machine may indicate that the virtual machine is to be used for a computationally intensive process or multimedia, and the hypervisor 120 may determine that the virtual machine comprises an important process based on this indication.

The determination that the virtual machine comprises an important process may be a determination that the virtual machine is itself an important process, that the guest operating system 161 of the virtual machine is an important process, that one of the guess processes 162 of the virtual machine is an important process, or some other determination.

At block 240, one or more processing devices are selected to be pinned to important virtual machine. The processing devices may be selected by the hypervisor 120. In one aspect, only one processing device is selected for exclusive use by the important virtual machine. In another aspect, more than one processing device is selected for exclusive use by the important virtual machine. For example, in one aspect, two processing devices may be selected for exclusive use by the virtual machine, one to handle interrupts generated by the virtual machine and another to handle other processes. In another aspect, a multicore virtual machine, a virtual machine with a plurality of virtual processing cores in emulation of a physical machine having a plurality of processing cores, may be instantiated and one processing device may be selected for each virtual core of the multicore virtual machine. In the aspect illustrated by FIGS. 3A-3C, one processing device, CPU4 114, is selected for the important virtual machine.

At block 250, execution of the hypervisor 120 in the selected processing devices is halted. The hypervisor 120 continues to execute in the other processing devices. Similarly, other processes, such as other virtual machines, other user processes, or other host operating system processes are also halted in the selected processing devices. FIG. 3B illustrates an exemplary processing resource allocation that may result after block 250. As shown in FIG. 3B, the hypervisor 120 is halted from executing in CPU4 114, but continues to execute in the other processing devices 111-113. Similarly, the first virtual machine 131 is halted from executing in the selected processing device, but continues to execute in the other processing devices 111-113.

At block 260, the important virtual machine is instantiated in the selected one or more processing devices. The important virtual machine may be instantiated and managed by the hypervisor 120. FIG. 3C illustrates an exemplary processing resource allocation that may result after block 260. As shown in FIG. 3C, the hypervisor 120 and the first virtual machine are allocated and execute in the first three processing devices 111-113, whereas the important virtual machine 132 is allocated and executes in the selected processing device 114. Other processes not show in FIGS. 3A-3C, such as an interrupt handler, may also run in the first three processing devices 111-113 without running in the selected processing device 114.

At block 270, one or more processes of the virtual machine are executed in the selected one or more processing devices. As noted above, the important virtual machine executes in the selected one or more processing devices. The guest operating system 161 and guess processes 162 or the important virtual machine may also execute in the selected one or more processing devices.

Figure 4:
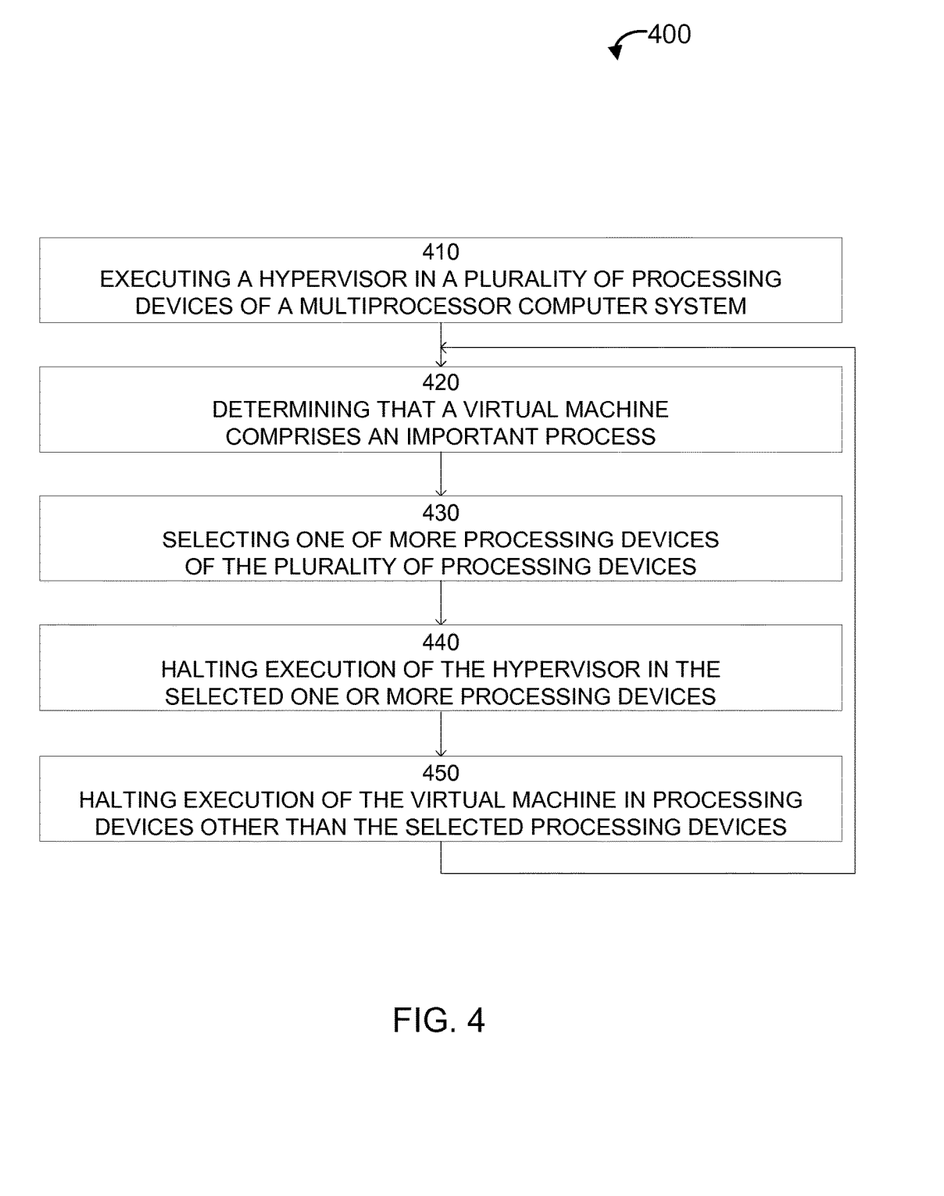
FIG. 4 is a block diagram that illustrates an embodiment of a method of dedicating a processing device to an instantiated virtual machine.

FIG. 4 is a flow diagram illustrating one embodiment for a method 400 of dedicating a processing device to an instantiated virtual machine. The method 400 of FIG. 4 is described below with further reference to FIGS. 5A-5C which diagrammatically show processing resource allocation. In a similar manner to FIGS. 3A-3C, FIGS. 5A-5C illustrate the allocation of processing devices 110 to the hypervisor 120 and virtual machines 131, 132 at various stages of the method 400 of FIG. 4.

Method 400 may be performed by processing logic that may include hardware (e.g., circuitry, dedicated logic, programmable logic, microcode, etc.), software (e.g., instructions executed by a processing device), or a combination thereof. For example, method 400 may be performed by host operating system 155 of FIG. 1.

Figure 5A:
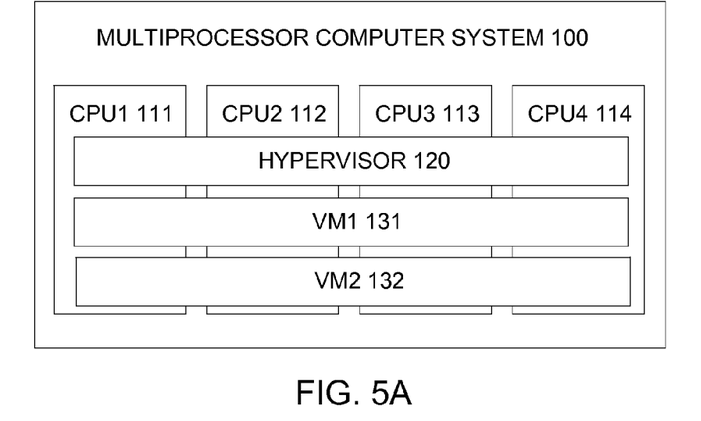
FIG. 5A is a block diagram of an embodiment of multiprocessor computer system running processes in all processing devices.

At block 410 of method 400, a hypervisor is executed in a plurality of processing devices of a multiprocessor computer system. One or more virtual machines may also be executed in the plurality of processing devices of the multiprocessor computer system. FIG. 5A illustrates an exemplary processing resource allocation that may result after block 410. As shown in FIG. 5A, a hypervisor 120 is executed in all four processing devices 111-114 of the multiprocessor computer system 100. Similarly, a first virtual machine 131 and a second virtual machine 132 are also executed in all four processing devices 111-114 of the multiprocessor computer system 100.

At block 420, it is determined that an executing virtual machine comprises an important process. This determination may be made by the hypervisor 120. In one aspect, the hypervisor 120 determines that the virtual machine comprises an important process automatically based on predetermined criteria. In another aspect, the hypervisor 120 determines that the virtual machine comprises an important process based on an input received from a user. For example, a user may send a command to the hypervisor 120 that a particular virtual machine is to be designated important. In another example using predetermined criteria, a virtual machine may attempt to execute or be executing a computationally intensive process or rendering of multimedia, and the hypervisor 120 may determine that the virtual machine comprises an important process based on this attempt or execution.

At block 430, one or more processing devices are selected to be pinned to important virtual machine. The processing devices may be selected by the hypervisor 120.

At block 440, execution of the hypervisor 120 ceases its operation in the selected processing devices, but continues to execute in the other processing devices. Similarly, the hypervisor 120 may halt other processes, such as other virtual machines, other user processes, or other host operating system processes in the selected processing devices.

Figure 5B:
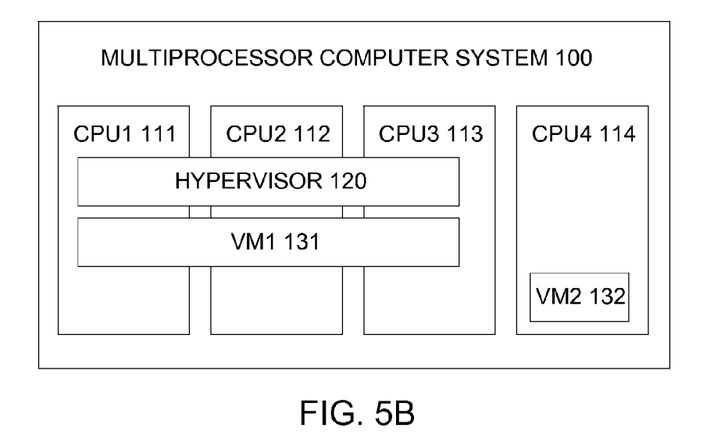
FIG. 5B is a block diagram of the multiprocessor computer system of FIG. 5A with a dedicated processing device for a first virtual machine.

At block 450, execution of the important virtual machine is halted in processing devices other than the selected processing devices. Execution of the important virtual machine continues, exclusively, in the selected processing devices. FIG. 5B illustrates an exemplary processing resource allocation that may result after block 450. As shown in FIG. 5B, the hypervisor 120 is halted from executing in CPU4 114, but continues to execute in the other processing devices 111-113. Similarly, the first virtual machine 131 is halted from executing in the selected processing device, but continues to execute in the other processing devices 111-113. The important virtual machine is halted from executing in the other processing devices 111-113, but continues to execute in the selected processing device 114.

Figure 5C:
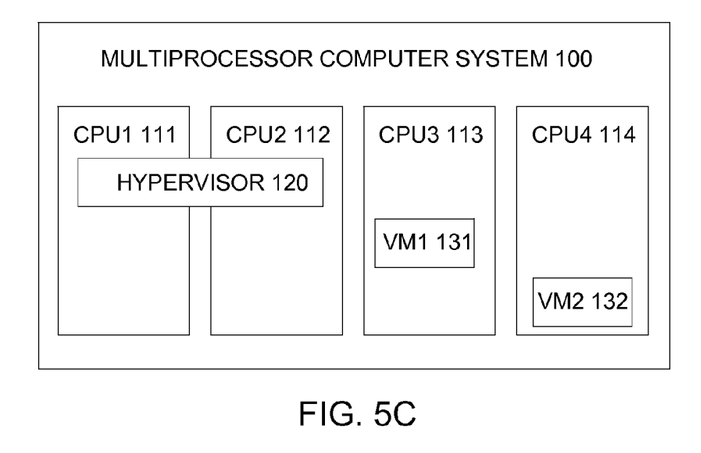
FIG. 5C is a block diagram of the multiprocessor computer system of FIG. 5B with dedicated processing devices for a first virtual machine and a second virtual machine.

After block 450, the method 400 may return to block 420 to determine that another virtual machine is important. FIG. 5C illustrates an exemplary processing resource allocation that may result after performing blocks 420, 430, 440 and 450 a second time. As shown in FIG. 5C, the hypervisor 120 is halted from executing in CPU4 114 (dedicated to a second virtual machine 132) and from executing in CPU3 113 (dedicated to a first virtual machine 131), but continues to execute in the other processing devices 111, 112.

Figure 6:
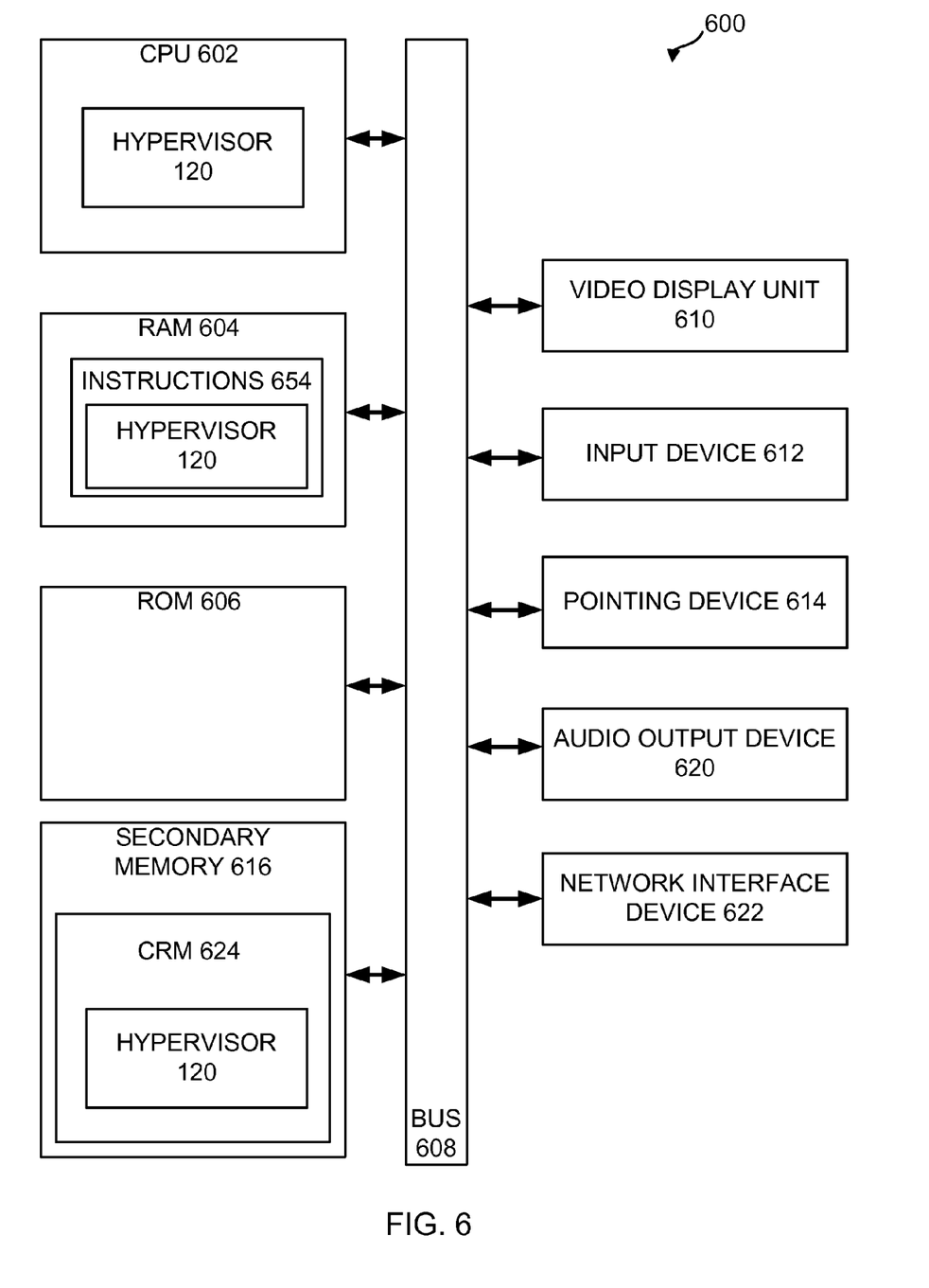
FIG. 6 illustrates a diagrammatic representation of a machine in the exemplary form of a computer system.

FIG. 6 illustrates a diagrammatic representation of a machine in the exemplary form of a computer system 600 within which a set of instructions, for causing the machine to perform any one or more of the methodologies discussed herein, may be executed. The computer system 600 may correspond to multiprocessor computer system 100 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 616 (e.g., a data storage device), which communicate with each other via a bus 608.

The processing device 602 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 602 may therefore include multiple processors. The processing device 602 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, system on chip (SoC), or the like.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions 654 embodying any one or more of the methodologies or functions described herein (e.g., hypervisor 120). The instructions 654 may also reside, completely or at least partially, within the main memory 604 and/or within the processing device 602 during execution thereof by the computer system 600; the main memory 604 and the processing device 602 also constituting machine-readable storage media.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine that cause the machine to perform any one or more of the methodologies of the present invention. The term "computer-readable storage medium" shall accordingly be taken to include, but not be limited to, non-transitory media such as solid-state memories, and optical and magnetic media.

The modules, components and other features described herein (for example in relation to FIG. 1) can be implemented as discrete hardware components or integrated in the functionality of hardware components such as ASICS, FPGAs, DSPs, SoCs, or similar devices. In addition, the modules can be implemented as firmware or functional circuitry within hardware devices. Further, the modules can be implemented in any combination of hardware devices and software components, or only in software.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "adding", "receiving", "determining", "routing", "performing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first", "second", "third", "fourth", etc. as used herein are meant as labels to distinguish among different elements and may not necessarily have an ordinal meaning according to their numerical designation.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    executing, by a plurality of processing devices of a multiprocessor computer system, a hypervisor to manage scheduling of virtual machines;
    determining that a virtual machine comprises a first process to be executed with prioritized resource allocation;
    selecting a first processing device of the plurality of processing devices of the multiprocessor computer system to execute the first process;
    halting execution of the hypervisor on the first processing device while continuing the execution of the hypervisor on remaining processing devices of the plurality of processing devices other than the first processing device; and executing the first process of the virtual machine on the first processing device, wherein processes not of the virtual machine are excluded from executing on the first processing device.

2. The method of claim 1, wherein determining that the virtual machine comprises the first process comprises receiving an indication from a user that the virtual machine comprises the first process.

3. The method of claim 1, wherein determining that the virtual machine comprises the first process comprises determining that the virtual machine is to execute at least one of a computationally intensive process, an audiovisual rendering process, or a computer gaming process.

4. The method of claim 1, further comprising:
receiving an interrupt, wherein receiving the interrupt does not halt execution of the first process of the virtual machine on the first processing device; and
executing an interrupt handler on one or more of the plurality of processing devices separate from the first processing device.

5. The method of claim 1, further comprising:
executing, by the plurality of processing devices, the hypervisor prior to determining that the virtual machine comprise the first process;
receiving a request to instantiate the virtual machine comprising the first process;
halting the execution of the hypervisor on the first processing device; and
instantiating the virtual machine on the first processing device.

6. The method of claim 1, further comprising:
executing, by the plurality of processing devices, the hypervisor prior to determining that the virtual machine comprises the first process;
executing, by the plurality of processing devices, one or more processes of the virtual machine prior to determining that the virtual machine comprises the particular first process;
halting the execution of the hypervisor on the first processing device; and
halting the execution of the virtual machine on processing devices of the plurality of processing devices other than the first processing device.

7. The method of claim 1, further comprising:
determining that a second virtual machine comprises a second process to execute with prioritized resource allocation;
selecting a second processing device; and
executing one or more processes of the second virtual machine on the second processing device, wherein processes not of the second virtual machine are excluded from executing on the second processing device.

8. A system comprising:
a memory;
a plurality of processing devices operatively coupled to the memory, at least one of the plurality of processing devices to:
determine that a virtual machine comprises a first process to execute with prioritized resource allocation;
select a first processing device of the plurality of processing devices to execute the first process;
halt execution of the hypervisor on the first processing device while continuing the execution of the hypervisor on remaining processing devices of the plurality of processing devices other than the first processing device; and
execute the first process of the virtual machine on the first processing device, wherein processes not of the virtual machine are excluded from executing on the first processing device.

9. The system of claim 8, wherein to determine that the virtual machine comprises the first process, the at least one of the plurality of processing devices is to receive an indication from a user that the virtual machine comprises the first process.

10. The system of claim 8, wherein to determine that the virtual machine comprises the first process, the at least one of the plurality of processing devices is to determine that the virtual machine is to execute at least one of a computationally intensive process, an audiovisual rendering process, or a computer gaming process.

11. The system of claim 8, wherein the at least one of the plurality of processing devices is to:
receive an interrupt, wherein receiving the interrupt does not halt execution of the first process of the virtual machine on the first processing device; and
execute an interrupt handler on one or more of the plurality of processors separate from the first processing device.

12. The system of claim 8, wherein the at least one of the plurality of processors is to:
execute a hypervisor prior to determining that the virtual machine comprise the first process, the hypervisor to manage one or more virtual machines;
receive a request to instantiate the virtual machine comprising the first process;
halt the execution of the hypervisor on the first processing device; and
instantiate the virtual machine on the first processing device.

13. The system of claim 8, wherein the at least one of plurality of processing devices is to:
execute a hypervisor prior to determining that the virtual machine comprise the first process, the hypervisor to manage one or more virtual machines;
execute one or more processes of the virtual machine prior to determining that the virtual machine comprise the first process;
halt the execution of the hypervisor on the first processing device; and
halt the execution of the virtual machine in the on processing devices of the plurality of processing devices other than the first processing device.

14. The system of claim 8, wherein the at least one of the plurality of processing devices is to:
determine that a second virtual machine comprises a second process to execute with prioritized resource allocation;
select a second processing device; and
execute one or more processes of the second virtual machine on the second processing device, wherein processes not of the second virtual machine are excluded from executing on the second processing device.

15. A non-transitory computer-readable medium having instructions that, when executed by at least one of a plurality of processing devices, causes the at least one of the plurality of processing devices to:
determine that a virtual machine comprises a first process to execute with prioritized resource allocation;

select a first processing device of the plurality of processing devices of to execute the particular process;

halt execution of the hypervisor on the first processing device while continuing the execution of the hypervisor on remaining processing devices of the plurality of processing devices other than the first processing device; and execute the first process of the virtual machine on the first processing device, wherein processes not of the virtual machine are excluded from executing on the first processing device.

16. The non-transitory computer-readable medium of claim 15, wherein to determine that the virtual machine comprises the first process, the at least one of the plurality of processing devices to receive an indication from a user that the virtual machine comprises the first process.

17. The non-transitory computer-readable medium of claim 15, wherein to determine that the virtual machine comprises the first process, the at least one of the plurality of processing devices to determine that the virtual machine is to execute at least one of a computationally intensive process, an audiovisual rendering process, or a computer gaming process.

18. The non-transitory computer-readable medium of claim 15, the at least one of the plurality of processing devices further to:

receive an interrupt, wherein receiving the interrupt does not halt execution of the first process of the virtual machine on the first processing device; and execute an interrupt handler on one or more of the plurality of processing devices separate from the first processing device.

19. The non-transitory computer-readable medium of claim 15, the at least one of the plurality of processing devices further to:

execute, by the plurality of processing devices, a hypervisor prior to determining that the virtual machine comprise the first process, the hypervisor to manage one or more virtual machines;

receive a request to instantiate the virtual machine comprising the first process;

halt the execution of the hypervisor on the first processing device; and instantiate the virtual machine on the first processing device.

20. The non-transitory computer-readable medium of claim 15, the at least one of the plurality of processing devices further to:

execute, by the plurality of processing devices, a hypervisor prior to determining that the virtual machine comprise the first process, the hypervisor to manage one or more virtual machines;

execute one or more processes of the virtual machine prior to determining that the virtual machine comprise the first process;

halt the execution of the hypervisor on the first processing device; and halt the execution of the virtual machine in the processing devices of the plurality of processing devices other than the first processing device.

\* \* \* \* \*

UNITED STATES PATENT AND TRADEMARK OFFICE
CERTIFICATE OF CORRECTION

PATENT NO. : 9,792,152 B2
APPLICATION NO. : 14/137746
DATED : October 17, 2017
INVENTOR(S) : Eduardo Warszawski and Yeela Kaplan It is certified that error appears in the above-identified patent and that said Letters Patent is hereby corrected as shown below:

In the Claims

In Claim 15, Column 11, Line 2, delete "of"

Signed and Sealed this
Twenty-sixth Day of December, 2017

Joseph Matal
*Performing the Functions and Duties of the
Under Secretary of Commerce for Intellectual Property and
Director of the United States Patent and Trademark Office*